(12) United States Patent
Sellers, Jr.

(10) Patent No.: US 9,152,997 B2
(45) Date of Patent: Oct. 6, 2015

(54) METHOD FOR BUYING AND SELLING STOCKS AND SECURITIES

(71) Applicant: Robert M. Sellers, Jr., Birmingham, AL (US)

(72) Inventor: Robert M. Sellers, Jr., Birmingham, AL (US)

(*) Notice: Subject to any disclaimer, the term of this patent is extended or adjusted under 35 U.S.C. 154(b) by 69 days.

(21) Appl. No.: 13/750,077

(22) Filed: Jan. 25, 2013

(65) Prior Publication Data

US 2013/0198110 A1    Aug. 1, 2013

Related U.S. Application Data

(60) Provisional application No. 61/591,525, filed on Jan. 27, 2012, provisional application No. 61/753,124, filed on Jan. 16, 2013.

(51) Int. Cl.
G06Q 40/00    (2012.01)
G06Q 40/06    (2012.01)
G06Q 40/04    (2012.01)

(52) U.S. Cl.
CPC .............. *G06Q 40/06* (2013.01); *G06Q 40/04* (2013.01)

(58) Field of Classification Search
None
See application file for complete search history.

(56) References Cited

U.S. PATENT DOCUMENTS

| | | | |
|---|---|---|---|
| 7,395,235 B2 * | 7/2008 | Dhurandhar et al. | 705/36 R |
| 7,464,052 B1 * | 12/2008 | Coppola, III | 705/35 |
| 7,752,123 B2 * | 7/2010 | Brookfield et al. | 705/37 |
| 7,865,423 B2 * | 1/2011 | Hughes et al. | 705/37 |
| 7,962,398 B1 * | 6/2011 | Swearingen et al. | 705/37 |
| 7,966,246 B2 * | 6/2011 | Ingargiola et al. | 705/37 |
| 7,970,694 B2 * | 6/2011 | Swearingen et al. | 705/37 |
| 8,055,574 B2 * | 11/2011 | Cutler et al. | 705/37 |
| 8,126,797 B2 * | 2/2012 | Jaffe | 705/36 R |
| 8,407,119 B2 * | 3/2013 | Folk et al. | 705/35 |
| 8,504,458 B1 * | 8/2013 | Lai et al. | 705/36 R |
| 8,548,889 B1 * | 10/2013 | Swearingen et al. | 705/36 R |
| 8,626,631 B2 * | 1/2014 | Tompkins | 705/36 R |
| 8,630,940 B1 * | 1/2014 | Walters | 705/37 |
| 8,682,773 B1 * | 3/2014 | Murphy et al. | 705/36 R |
| 8,694,410 B1 * | 4/2014 | Millett | 705/37 |
| 8,706,599 B1 * | 4/2014 | Koenig et al. | 705/36 R |
| 2002/0007329 A1 * | 1/2002 | Alcaly et al. | 705/35 |
| 2002/0019803 A1 * | 2/2002 | Muller | 705/38 |
| 2003/0110124 A1 * | 6/2003 | Escher | 705/38 |
| 2003/0149648 A1 * | 8/2003 | Olsen et al. | 705/35 |
| 2003/0233304 A1 * | 12/2003 | Dhurandhar et al. | 705/36 |
| 2004/0153391 A1 * | 8/2004 | Burns et al. | 705/37 |
| 2005/0027638 A1 * | 2/2005 | Ng et al. | 705/37 |
| 2005/0187854 A1 * | 8/2005 | Cutler et al. | 705/37 |
| 2006/0047590 A1 * | 3/2006 | Anderson et al. | 705/35 |
| 2006/0287945 A1 * | 12/2006 | Spaccatrosi | 705/37 |
| 2007/0124235 A1 * | 5/2007 | Chakraborty et al. | 705/38 |

(Continued)

*Primary Examiner* — Gregory Johnson
(74) *Attorney, Agent, or Firm* — Wayne Edward Ramage; Baker Doudson

(57) ABSTRACT

A computer-based method and system for buying and selling stocks and other securities. In general, the method creates an indicator for the purchase point or period and selling point or period for a stock. The method uses various technical indicators that converge to form zones, roughly in the form of triangles when viewed in a graphical display. A buy, sell, or take no action indicator is then determined based upon the comparison of price linear regression data to the other indicators described above. When the linear regression line or data at a point or for a period is greater than (i.e., above) all of the other indicators, this results in a buy indication. When the linear regression line or data at a point or for a period is lower than (i.e., below) all of the other indicators, this results in a sell indication.

11 Claims, 1 Drawing Sheet

(56) References Cited

U.S. PATENT DOCUMENTS

| | | | |
|---|---|---|---|
| 2008/0015967 A1* | 1/2008 | Gilmer | 705/37 |
| 2008/0077539 A1* | 3/2008 | Drain | 705/36 R |
| 2008/0097884 A1* | 4/2008 | Ferris | 705/36 R |
| 2008/0109383 A1* | 5/2008 | Jaffe | 705/36 R |
| 2008/0243711 A1* | 10/2008 | Aymeloglu et al. | 705/36 R |
| 2008/0319886 A1* | 12/2008 | Winans | 705/35 |
| 2009/0048985 A1* | 2/2009 | Kuhnle et al. | 705/400 |
| 2009/0119195 A1* | 5/2009 | Kurczek et al. | 705/35 |
| 2009/0119226 A1* | 5/2009 | Kurczek et al. | 705/36 R |
| 2009/0204548 A1* | 8/2009 | Swearingen et al. | 705/36 R |
| 2010/0057600 A1* | 3/2010 | Johansen et al. | 705/37 |
| 2010/0174665 A1* | 7/2010 | Lanng | 705/36 R |
| 2011/0066539 A1* | 3/2011 | Auerbach | 705/37 |
| 2011/0066544 A1* | 3/2011 | Hughes et al. | 705/37 |
| 2011/0087581 A1* | 4/2011 | Ram et al. | 705/37 |
| 2011/0137821 A1* | 6/2011 | Mendelsohn | 705/36 R |
| 2011/0161223 A1* | 6/2011 | Buck | 705/37 |
| 2011/0246390 A1* | 10/2011 | Yang | 705/36 R |
| 2011/0295766 A1* | 12/2011 | Tompkins | 705/36 R |
| 2011/0320335 A1* | 12/2011 | Gorelik et al. | 705/37 |
| 2012/0221455 A1* | 8/2012 | Chau | 705/37 |
| 2013/0030976 A1* | 1/2013 | Helweg | 705/37 |
| 2013/0198110 A1* | 8/2013 | Sellers, Jr. | 705/36 R |
| 2013/0290216 A1* | 10/2013 | Scheffler | 705/36 R |
| 2013/0297531 A1* | 11/2013 | Becker et al. | 705/36 R |
| 2013/0325690 A1* | 12/2013 | Auerbach | 705/37 |

* cited by examiner

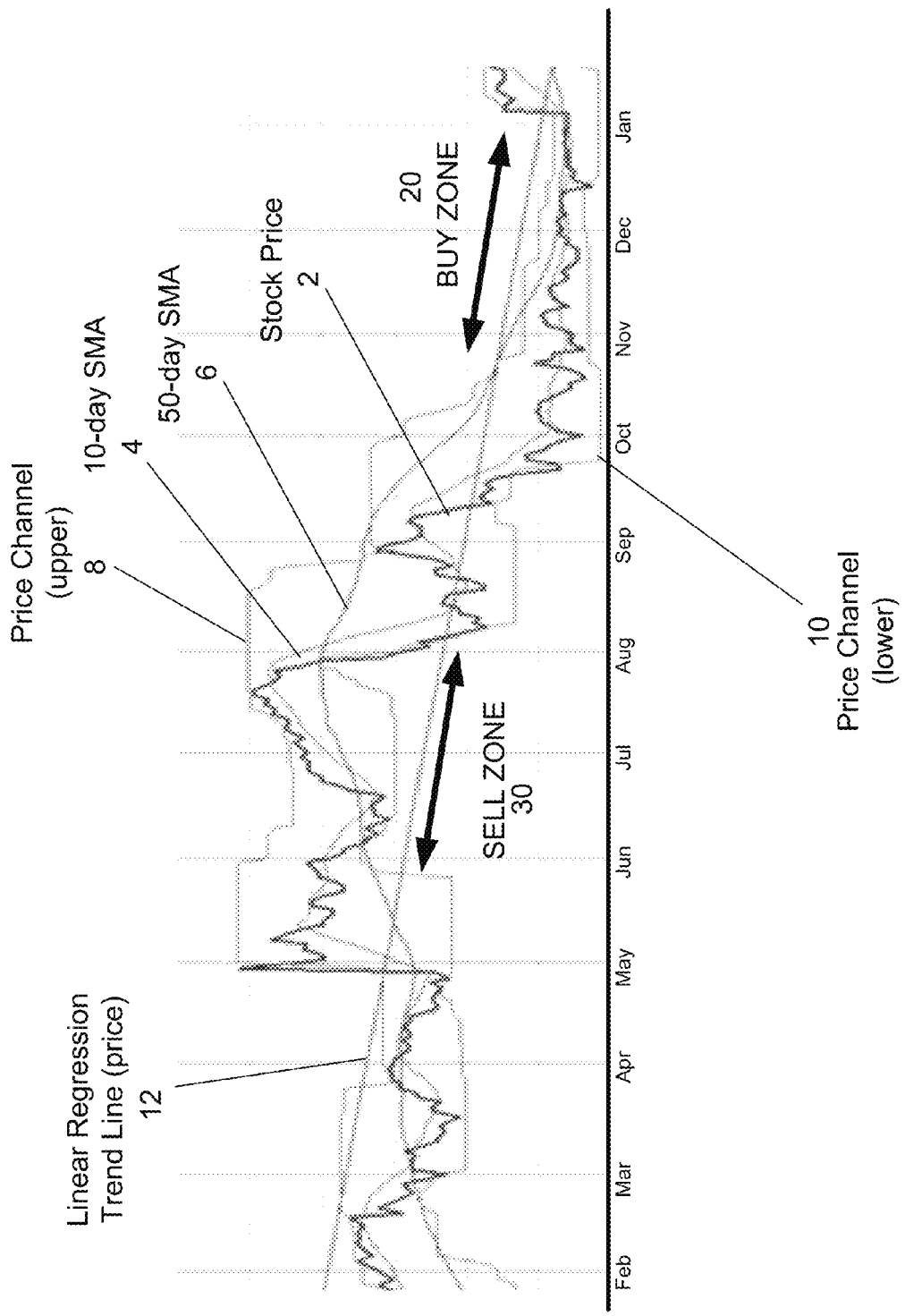

METHOD FOR BUYING AND SELLING STOCKS AND SECURITIES

This application claims benefit of and priority to U.S. Provisional Application No. 61/591,525, filed Jan. 27, 2012, by Robert M. Sellers, Jr., and Ser. No. 61/753,124, filed Jan. 16, 2013, by Robert M. Sellers, Jr., and is entitled to those filing dates for priority, in whole or in part. The specification, figures, appendices and complete disclosures of U.S. Provisional Application Nos. 61/591,525 and 61/753,124 are incorporated herein by specific reference for all purposes.

FIELD OF INVENTION

This invention relates to a system and method for analyzing stock and securities pricing information and making buy and sell decisions.

BACKGROUND OF THE INVENTION

Stock market forecasting and analysis systems and tools are well known, and have been used in various forms for many years. In general, these tools and methods attempt to predict the market behavior of stocks and securities, allowing the user to make better informed and more profitable decisions about when to purchase or sell a stock or security.

Examples of such systems include a method that employs historical data related to a particular stock in order to rapidly analyze trading potential and generate two graphical displays (U.S. application Ser. No. 09/945,965, Pub. No. 2002/0073017); a method that determines a "health rating" for stock market indices (U.S. application Ser. No. 10/273,645, Pub. No. 2004/0133496); a method for quantifying the market sentiment regarding a stock (U.S. application Ser. No. 11/680,877, Pub. No. 2008/021598); and a method for calculating moving average with weighed transaction volume (U.S. application Ser. No. 12/625,199, Pub. No. 2010/0121751); all of which are incorporated herein by specific reference in their entireties for all purposes. However, there is a need for improved methods and systems as prior art methods do not provide accurate indicators in timely manner, or require obtaining complex or difficult to acquire information.

SUMMARY OF INVENTION

In various embodiments, the present invention comprises a computer-based method and system for buying and selling stocks and other securities. In general, the method creates an indicator for the purchase point or period and selling point or period for a stock. The method uses various technical indicators, as described below, that converge to form zones, roughly in the form of triangles when viewed as a graphical display.

A computer or computing device is programmed to receive and display certain stock price information and calculated parameters. The information includes the following:
1. A line chart for the trailing 12 months price of the stock being examined.
2. The 10-day Simple Moving Average (SMA) of the stock. This is the Simple Moving Average of the closing stock price for the trailing (i.e., last) 10 days. A Simple Moving Average is calculated by adding the closing prices for a number of time intervals and dividing by that number, giving equal weight to each bar.
3. The 50-day SMA of the stock. This is the simple moving average of the closing stock price for the trailing 50 days.
4. The 20-day Price Channel. A price channel forms boundaries above and below a price line and can be used to measure volatility. The price channel comprises two generally parallel lines in a trend: the lower line is the 20-day trend line of the pivot lows, and the upper line is the 20-day trend line of the pivot highs. The two lines of the channel thus represent support and resistance in the market. Channels can be selected for any size of time frame. In this particular embodiment, a 20-day time frame is used, although other time frames may be used.
5. Linear Regression Trend Line. A linear regression trend line for the stock price information is calculated, smoothing out the price volatility of the stock. A linear regression indicator uses trend lines to plot a straight line through prices that minimize the distances between the prices.

The above information is received or calculated by the computing device, and displayed as a chart on a computer display or on a printout. A buy, sell, or take no action indicator is then determined based upon the comparison of the linear regression data to the other indicators described above. When the linear regression line or data is greater than (i.e., above) all of the other indicators, this results in a buy indication. When the linear regression line or data is lower than (i.e., below) all of the other indicators, this results in a sell indication.

Buy zones are created when the linear regression line is above all of the other indicators, and sell zones are created when the linear regression line is below all of the other indicators. These zones roughly take the shape of triangles, that represent the optimal buy and sell zones for the stock being examined. Consistently high yields and gains can be obtained, and losses avoided, by buying a stock only when a buy zone is indicated, and selling only when a sell zone is indicated.

DESCRIPTION OF THE DRAWINGS

FIG. 1 shows a view of a computer-generated stock analysis chart in accordance with an embodiment of the present invention.

DETAILED DESCRIPTION OF EXEMPLARY EMBODIMENTS

In one exemplary embodiment, the present system comprises a computer-based method and process for buying and selling stocks and other securities. In general, the method creates an indicator for the purchase point or period and selling point or period for a stock. The method uses various technical indicators, as described below, that converge to form zones, roughly in the form of triangles when viewed in a graphical display.

In one embodiment, a computer or computing device is programmed to receive and display certain stock price information and calculated parameters. The information includes the following:
1. A line chart for the trailing 12 months price of the stock being examined.
2. The 10-day Simple Moving Average (SMA) of the stock. This is the Simple Moving Average of the closing stock price for the trailing (i.e., last) 10 days. A Simple Moving Average is calculated by adding the closing prices for a number of time intervals and dividing by that number, giving equal weight to each bar.
3. The 50-day SMA of the stock. This is the simple moving average of the closing stock price for the trailing 50 days.
4. The 20-day Price Channel. A price channel forms boundaries above and below a price line and can be used to measure volatility. The price channel comprises two generally parallel lines in a trend: the lower line is the 20-day trend line of the pivot lows, and the upper line is the 20-day trend line of the pivot highs. The two lines of the channel thus represent support and resistance in the market. Channels can be selected for any size of time frame. In this particular embodiment, a 20-day time frame is used, although other time frames may be used.

5. Linear Regression Trend Line. A linear regression trend line for the stock price information is calculated, smoothing out the price volatility of the stock. A linear regression analysis plots a straight line through a series of prices that minimizes the distances between the price points and the linear regression line.

The above information is received or calculated by the computing device. The information may be as a chart or graph, such as that seen in FIG. 1, on a computer display or on a printout.

A buy, sell, or take no action indicator is then determined based upon the comparison of the linear regression data to the other indicators described above. When the linear regression line or data at a point or for a period is greater than (i.e., above) all of the other indicators, this results in a buy indication. When the linear regression line or data at a point or for a period is lower than (i.e., below) all of the other indicators, this results in a sell indication.

These relationships can be seen graphically in FIG. 1. Buy zones 20 are indicated when the linear regression line 12 is above all of the other indicators (stock price 2, 10-day SMA 4, 50-day SMA 6, upper price channel 8, and lower price channel 10), and sell zones 30 are indicated when the linear regression line 12 is below all of the other indicators. These zones roughly take the shape of triangles with the linear regression line as the base of the triangles, and represent the optimal buy and sell zones for the stock being examined. Consistently high yields and gains can be obtained, and losses avoided, by buying a stock only when a buy zone is indicated, and selling only when a sell zone is indicated.

It should be noted that an action decision at any particular point in time involves a comparison of the value of the linear regression trend line for that point to the values of the other indicators at that point in time (i.e., the stock price, the values of the 10-day and 50-day SMAs, and the values of the upper and lower price channel). If the value of the linear regression trend line is greater than the values of each of the other indicators, then an action decision to buy is indicated. If the value of the linear regression trend line is lower than the values of each of the other indicators, then an action decision to sell is indicated. Otherwise, no action is indicated.

In another exemplary embodiment, the system monitors the number of days in which a buy or sell action, as determined above, is indicated. The system may not recommend a buy or sell action until it detects a certain number of consecutive days (or other time periods) with the same action being indicated.

By way of background, the following description for several of the above calculations is provided.

A Simple Moving Average (SMA) is the unweighted mean of a series of previous data points. This is contrast to a simple average or mean taken from a number of data points on either side of a central value. For example, for a n day sample of closing price p for a stock or security, where the closing prices are $p_M, p_{M-1}, \ldots, p_{M-(n-1)}$, $$SMA = \frac{p_M + p_{M-1} + \ldots + p_{M-(n-1)}}{n}$$

Price channels in context of stock or security prices at a particular point are simply the high and low prices for a previous period of time, x. These high and low prices, when displayed graphically with stock price data, are shown as lines above and below the security price. Thus, for example, a 20-day price channel for a particular point would have an upper channel equaling the 20-day high price, and a lower channel equaling the 20-day low price. The highs and lows do not include the most recent or current time period, and thus prices for the most recent time period can exceed the price channel boundaries. A centerline often is shown as a midpoint between the two channel lines. The time period, x, also known as a look-back period, can be shorter or longer. Shorter periods result in narrower channels, while longer period result in wider channels.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A machine for analyzing stock and securities pricing information, comprising:
   a processor or microprocessor coupled to a memory, wherein the processor or microprocessor is programmed to analyze stock and securities pricing information by:
   receiving price information for a stock or security, said price information comprising opening price, closing price, high price, and low price per day for a period of at least the last twelve months;
   performing a linear regression on the price information to determine a linear regression trend;
   comparing the value of the linear regression trend for the current period or point in time to the following indicators:
   (a) the stock or security price for the current period or point in time;
   (b) the simple moving average of the closing stock or security price for the trailing ten days;
   (c) the simple moving average of the closing stock or security price for the trailing fifty days;
   (d) the value of the trend line for the pivot lows for the stock or security price for a certain period of trailing days; and
   (e) the value of the trend line for the pivot highs for the stock or security price for a certain period of trailing days;
   providing a graphical display of the linear regression trend, the stock or security price, the ten-day simple moving average, the fifty-day simple moving average, the pivot low trend line, and the pivot high trend line for a six-month time period or more; and
   providing a buy action indication when the value of the linear regression trend is greater than each of the indicators (a) through (e), a sell action indication when the value of the linear regression trend is lower than each of the indicators (a) through (e), and a no-action indication otherwise.

2. The machine of claim 1, wherein the buy action indication or sell action indication is given only when the value of the linear regression trend is greater or lesser than each of the indicators exceeds a threshold number of consecutive days or time periods.

3. The machine of claim 1, wherein the period of trailing days for determining the value of the trend line for the pivot lows and highs is 20 days.

4. A non-transitory computer-readable storage medium with an executable program stored thereon, wherein the program instructs a processor or microprocessor to perform the following steps:
  receiving price information for a stock or security, said price information comprising opening price, closing price, high price, and low price per day for a period of at least the last twelve months;
  performing a linear regression on the price information to determine a linear regression trend;
  comparing the value of the linear regression trend for the current period or point in time to the following indicators:
    (a) the stock or security price for the current period or point in time;
    (b) the simple moving average of the closing stock or security price for the trailing ten days;
    (c) the simple moving average of the closing stock or security price for the trailing fifty days;
    (d) the value of the trend line for the pivot lows for the stock or security price for a certain period of trailing days; and
    (e) the value of the trend line for the pivot highs for the stock or security price for a certain period of trailing days;
  providing a graphical display of the linear regression trend, the stock or security price, the ten-day simple moving average, the fifty-day simple moving average, the pivot low trend line, and the pivot high trend line for a six-month time period or more; and
  providing a buy action indication when the value of the linear regression trend is greater than each of the indicators (a) through (e), a sell action indication when the value of the linear regression trend is lower than each of the indicators (a) through (e), and a no-action indication otherwise.

5. The storage medium of claim 4, wherein the buy action indication or sell action indication is given only when the value of the linear regression trend is greater or lesser than each of the indicators exceeds a threshold number of consecutive days or time periods.

6. The storage medium of claim 4, wherein the period of trailing days for determining the value of the trend line for the pivot lows and highs is 20 days.

7. A computer-based method for analyzing stock and securities pricing information, comprising:
  receiving, in a computer memory coupled to a processor or microprocessor, price information for a stock or security, said price information comprising opening price, closing price, high price, and low price per day for a period of at least the last twelve months;
  performing a linear regression on the price information using the processor or microprocessor to determine a linear regression trend;
  calculating the simple moving average of the closing stock or security price for the trailing ten days;
  calculating the simple moving average of the closing stock or security price for the trailing fifty days;
  calculating the value of the trend line for the pivot lows for the stock or security price for a certain period of trailing days;
  calculating the value of the trend line for the pivot highs for the stock or security price for a certain period of trailing days; and
  providing a graphical display of the linear regression trend, the stock or security price, the ten-day simple moving average, the fifty-day simple moving average, the pivot low trend line, and the pivot high trend line for a six-month time period or more.

8. The method of claim 7, further comprising the step of providing an investment decision indication regarding the stock or security based upon the graphical display.

9. The method of claim 8, wherein a buy indication is given for any point or period in time when the value of the linear regression trend is greater than the values of the stock or securities price, the ten-day simple moving average, the fifty-day simple moving average, the pivot low trend line, and the pivot high trend line.

10. The method of claim 8, wherein a sell indication is given for any point or period in time when the value of the linear regression trend is lesser than the values of the stock or securities price, the ten-day simple moving average, the fifty-day simple moving average, the pivot low trend line, and the pivot high trend line.

11. The method of claim 7, wherein the period of trailing days for determining the value of the trend line for the pivot lows and highs is 20 days.

* * * * *